United States Patent
Pothanikat et al.

(10) Patent No.: US 7,467,766 B2
(45) Date of Patent: Dec. 23, 2008

(54) ACOUSTIC DAMPENING PIPE SHOE

(76) Inventors: John J. Pothanikat, 3902 Waterview Ct., Missouri City, TX (US) 77459; Edward Earl Schauseil, II, 4606 Cobb Circle Dr., Sugar Land, TX (US) 77479

( * ) Notice: Subject to any disclaimer, the term of this patent is extended or adjusted under 35 U.S.C. 154(b) by 48 days.

(21) Appl. No.: 11/506,327

(22) Filed: Aug. 18, 2006

(65) Prior Publication Data

US 2008/0042018 A1    Feb. 21, 2008

(51) Int. Cl.
*F16L 3/08*    (2006.01)
*F16M 13/00*    (2006.01)

(52) U.S. Cl. ......................... 248/65; 248/560

(58) Field of Classification Search .................. 248/55, 248/560, 632, 633, 65
See application file for complete search history.

(56) References Cited

U.S. PATENT DOCUMENTS

| | | | | |
|---|---|---|---|---|
| 3,606,218 | A * | 9/1971 | Enlund et al. | 248/74.2 |
| 3,891,006 | A * | 6/1975 | Lee | 138/106 |
| 3,980,262 | A * | 9/1976 | Lee | 248/65 |
| 4,323,088 | A | 4/1982 | McClellan | |
| 4,530,478 | A | 7/1985 | McClellan | |
| 4,787,583 | A * | 11/1988 | Morton | 248/55 |
| 4,804,158 | A * | 2/1989 | Collins et al. | 248/74.4 |
| 4,951,902 | A * | 8/1990 | Hardtke | 248/74.1 |
| 5,381,833 | A * | 1/1995 | Cummings et al. | 138/107 |
| 5,731,359 | A | 3/1998 | Moser et al. | |
| 5,942,656 | A * | 8/1999 | Slaugh et al. | 585/864 |
| 5,947,425 | A | 9/1999 | Gerster | |
| 6,575,412 | B2 * | 6/2003 | Klezath | 248/58 |
| 7,213,790 | B2 * | 5/2007 | Bailey et al. | 248/65 |

FOREIGN PATENT DOCUMENTS

| | | |
|---|---|---|
| EP | 0060547 | 3/1982 |
| EP | 0159958 | 2/1985 |
| EP | 0884518 | 6/1998 |
| GB | 2315707 | 1/1998 |

OTHER PUBLICATIONS

Marinite® P data sheet, BNZ Materials, Inc., BNZ R-440 Nov. 1992.
Unicoat 5800 material data sheet, Unicoat International.

* cited by examiner

*Primary Examiner*—Anita M King
(74) *Attorney, Agent, or Firm*—KBR IP Legal

(57) ABSTRACT

Pipe shoe can include pipe retained by clamp attached to top plate. Acoustic isolation block is disposed for compression between top plate and bottom plate. Top plate is retained to bottom plate by stud(s) and nut(s). Flexible peripheral seal is disposed around acoustic isolation block between top and bottom plates. Pipe shoe can include thermal insulation and/or protective covering over any portion of pipe shoe and/or hot pipe.

3 Claims, 5 Drawing Sheets

ACOUSTIC DAMPENING PIPE SHOE

CROSS REFERENCE TO RELATED APPLICATIONS

FIELD

The embodiments relates to a pipe shoe, and more particularly, to a pipe shoe for supporting a noise-transmitting high temperature pipe.

BACKGROUND

Pipe shoes are utilized in various industries to support piping. Vibrations, for example, from the processing or flow of fluids, can propagate through pipe, pipe shoes, and supporting structure and lead to significant noise emissions therefrom. Occupational noise exposure is frequently regulated, e.g. in the U.S. under the Occupational Safety & Health Administration (OSHA) standards. Noise abatement in cold insulated, ambient temperature and/or small diameter piping is frequently effected simply by insulating the pipe itself. Hot piping, on the other hand, especially in the 50 mm and greater diameters, presents unique problems for noise control because methods and/or materials suitable for isolating cold piping can be inadequate if exposed to the high temperatures and/or compressive forces in a hot pipe where it is supported on a pipe shoe or other support device.

Pipe shoes commonly include a base and a pair of axially spaced clamps for interconnecting a generally lower semi-circular clamp fixed to the base to a generally upper semi-circular clamp, so that the connected clamps support the piping. The base may slide along the planar upper surface of the pipe rack as the process pipe expands or contracts in length. The generally lower clamp half is welded to the base, so that the weight of the pipe is supported on the generally lower clamp half. Ears project radially outward from both the lower and upper clamp halves, and a pair of conventional bolts interconnects the mating radially-opposing ears to secure the piping to the pipe shoe.

BRIEF DESCRIPTION OF THE DRAWINGS

The detailed description will be better understood in conjunction with the accompanying drawings as follows.

Figure 1:
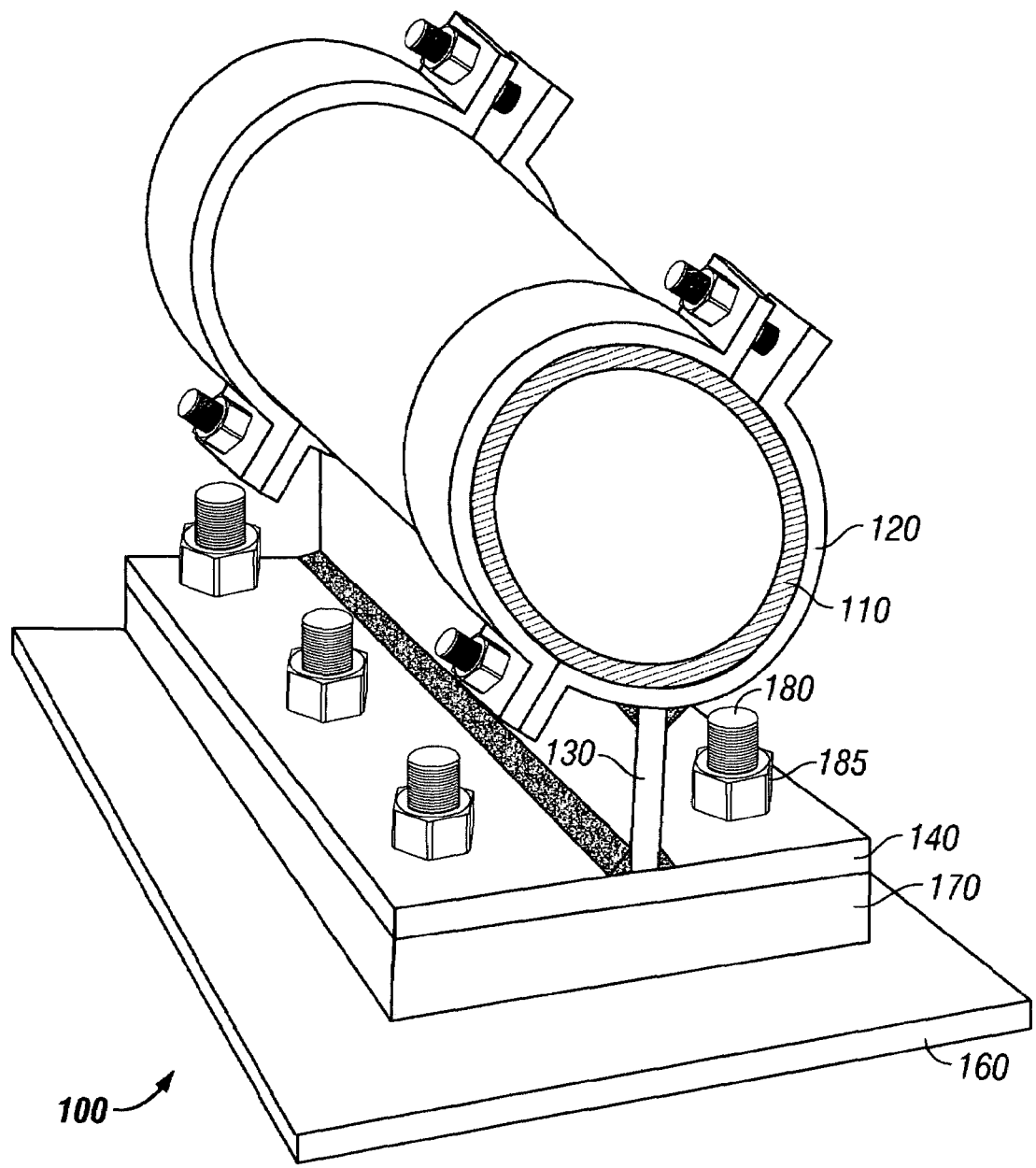
FIG. 1 depicts a perspective illustration of a pipe shoe for dampening acoustic propagation from a hot pipe, according to one embodiment.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that they can be practiced or carried out in various ways.

An embodiment is a pipe shoe with a utility for dampening acoustic propagation from a hot insulated pipe. The pipe shoe can include an acoustic isolation block disposed for compression between opposing top and bottom plates, a pipe support member connected between the top plate and a pipe supported thereby, and at least one fastener retaining the top plate to the bottom plate. The pipe shoe can include a flexible peripheral seal around the acoustic isolation block and/or between the bottom and top plates. The pipe shoe can include thermal insulation over exposed surfaces of the pipe and pipe support member. Thermal insulation can be further disposed over exposed surfaces of the bottom plate, the acoustic isolation block, the top plate, or a combination thereof. A protective covering can be included over the thermal insulation.

In an embodiment, a pipe shoe for dampening acoustic propagation from a hot insulated pipe includes an acoustic isolation block disposed for compression between opposing top and bottom plates, at least one clamp connected to the top plate supporting a pipe, and at least one fastener retaining the top plate to the bottom plate. The pipe shoe can include a flexible peripheral seal between the bottom and top plates around the acoustic isolation block. Thermal insulation can be included over exposed surfaces of the pipe and the at least one clamp. Thermal insulation can be further disposed over exposed surfaces of the bottom plate, the acoustic isolation block, the flexible peripheral seal, the top plate, or a combination thereof. A protective covering can be included over the thermal insulation. At least one fastener can be a stud connected to the bottom plate extending through a bore in the acoustic isolation block and an aperture in the top plate to a nut. A flexible seal can be included between the top plate and the fastener. The acoustic isolation block can be fiber-reinforced calcium silicate. The flexible peripheral seal can be formed from a high temperature elastomer such as, for example, polysulfide epoxy.

In an embodiment, a pipe shoe for dampening acoustic propagation from a hot insulated pipe includes an acoustic isolation block disposed for compression between opposing top and bottom plates, at least one clamp connected to the top plate supporting a pipe, at least one fastener retaining the top plate to the bottom plate and comprising a stud connected to the bottom plate extending through a bore in the acoustic isolation block and the top plate to a nut, a flexible peripheral seal between the bottom and top plates around the acoustic isolation block, thermal insulation over exposed surfaces of the pipe, the at least one clamp, the top plate, the seal, or a combination thereof, and a protective covering over the thermal insulation.

Dampening acoustic propagation from a hot insulated pipe supported on a pipe shoe can be achieved by attaching the pipe to a base plate. An acoustic isolation block for compression is disposed between the base plate and an opposing sub-base plate, and the base plate is retained to the sub-base plate with at least one fastener. An example of a fastener is a nut attached to a stud connected to the sub-base plate, wherein the stud extends through a bore in the acoustic isolation block and an aperture in the base plate. A seal can be formed between the base plate and the at least one fastener. A flexible peripheral seal can be formed between the base and sub-base plates around the acoustic isolation block. Thermal insulation can be installed over at least the exposed surfaces of the pipe and pipe support member, and if desired, over exposed surfaces of the sub-base plate, the acoustic isolation block, the flexible peripheral seal, the base plate, or a combination thereof. A protective covering can be installed over the thermal insulation. A weather seal can be formed at a base of the protective covering.

In an embodiment, a pipe support system includes a hot insulated pipe supported on a pipe shoe that has a pipe support member attached the pipe to a base plate. The system can include an acoustic isolation block disposed for compression between the base plate of the pipe shoe and an opposing sub-base plate. At least one fastener can retain the base plate to the sub-base plate. A flexible peripheral seal can be formed between the base and sub-base plates around the acoustic isolation block. The system can include thermal insulation over exposed surfaces of the pipe and pipe support member, and one or a combination of the sub-base plate, the acoustic isolation block, the flexible peripheral seal, or the base plate. A protective covering can be placed over the thermal insulation.

With reference to the figures, FIG. 1 depicts a perspective illustration of a pipe shoe 100 for dampening acoustic propagation from a hot pipe 110, according to one embodiment. Pipe shoe 100 can include a clamp 120 supporting pipe 110. Clamp 120 can be a double bolt clamp as shown, and further can be any type of clamp known in the art, such as, for example, a single bolt clamp, a clamp with sections joined by weldment, a band type clamp, etc. Pipe shoe 100 is shown with a clamp 120, and any type of pipe support member known to one of ordinary skill in the art can be included. For example, support bar 130 can be welded directly to the pipe 110 to form an integral pipe support member if desired.

Clamp 120 can attach to a top plate via optional support bar 130 by any means known in the art, which can include, but is not limited to, a weld, adhesive, or other fastener(s). Support bar 130 can be a continuous length as shown. Support bar 130 can be further connected to top plate 140.

The pipe 110 in this embodiment can be retained by a relatively rigid pipe support member (e.g., clamp 120). Vibrations of the pipe 110 can be transmitted to the support bar 130 and top plate 140. To dampen the acoustic propagation from hot pipe 110, a dampening means can be appropriate.

Figure 2:
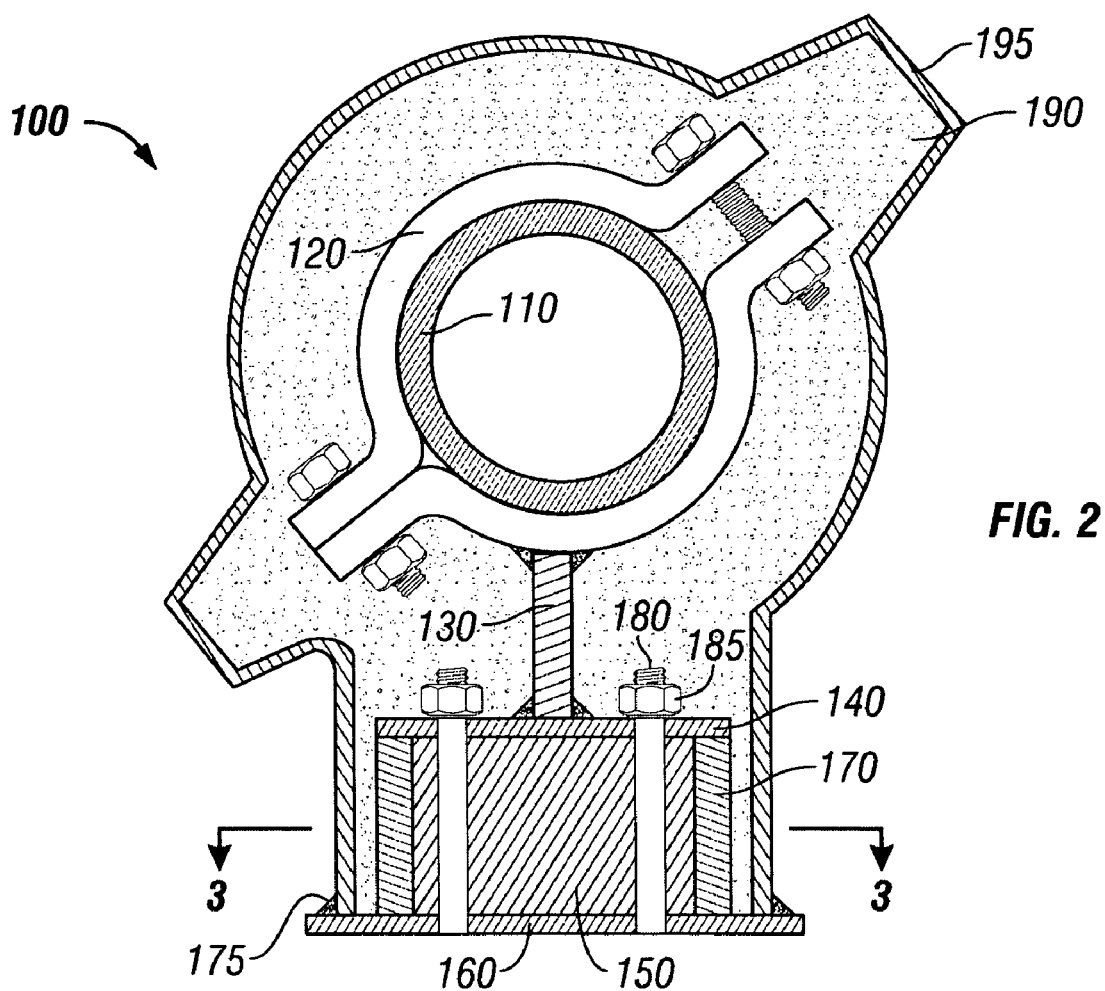
FIG. 2 depicts a cross-sectional schematic illustration of the pipe shoe exampled in FIG. 1.
Figure 3:
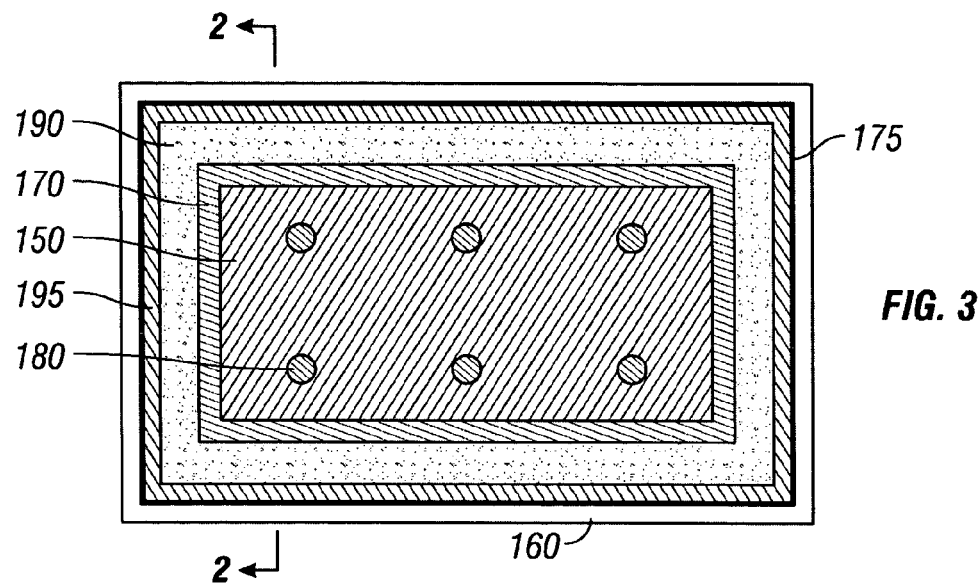
FIG. 3 depicts a cross-sectional schematic illustration of the bottom plate, flexible peripheral seal, and acoustic isolation block of the pipe shoe along the lines 3-3 of FIG. 2.

FIG. 2 depicts a cross-sectional schematic illustration of the pipe shoe exampled in FIG. 1. FIG. 3 depicts a cross-sectional schematic illustration of the bottom plate, flexible peripheral seal, and acoustic isolation block of the pipe shoe along the lines 3-3 of FIG. 2. The pipe shoe 100 and pipe 110 can be conveniently made from metal such as steel or aluminum, or high temperature alloys can be employed where appropriate.

With reference FIG. 1, FIG. 2, and FIG. 3 cumulatively, the acoustic isolation block 150 can be exposed to high compressive loads, for example, from the weight of the pipe 110, insulation 190, protective covering 195, etc. The acoustic isolation block 150 can be suitable for use in a hot environment, for example, above 100° C., and can also be incombustible or at least flame resistant. One example of an acoustic isolation block 150 suitable for exposure to high compressive loads can be a fiber-reinforced calcium silicate, such as that commercially available under the trade designations MARINITE, MARINITE P, MARINITE L, etc.

An acoustic isolation block 150 can be disposed between opposing top 140 and bottom 160 plates. Bottom plate 160 can include a layer or coating of a material with a low coefficient of friction, if desired, or can be permanently attached to or integral with an underlying support structure.

A fastener can be used to retain the top plate 140 to the bottom plate 160. A fastener can include, but is not limited to, any combination of nut, bolt, stud, weldment, washer, rivet, screw, wire, or the like. In the embodiment exampled in FIG. 1, FIG. 2, and FIG. 3, a stud 180 is attached, for example, by weldment, to bottom plate 160. Stud 180 extends through a bore in the acoustic isolation block 150, as seen best in FIG. 2, and extends through an aperture in top plate 140. Nut 185 can be threadedly attached to proximal end of stud 180 to retain an assembly of the top plate 140, acoustic isolation block 150, and bottom plate 160, taking care not to overtighten nut 185 to the extent that the material of the isolation block might be damaged. Any number of fasteners can be used, and the quantity can be more less than the six shown in the embodiment exampled in FIG. 1, FIG. 2, and FIG. 3. The embodiment of the pipe shoe 100 can include two clamps 120 as shown, or a single or greater plurality of clamps and/or other pipe support members can be included. In an embodiment, the clamps 120 can be secured directly to the hot pipe, without any sound or thermal insulation disposed between the clamps and the pipe 110, for improved structural reliability.

A flexible peripheral seal 170 can be disposed around the isolation block 150 as best seen in FIG. 3. The peripheral seal 170 can cooperate with the isolation block 150 or aid the reduction of acoustic propagation, and can also be beneficial to minimize or eliminate the ingress and/or egress of fluid or contaminants to the acoustic isolation block 150, for example, especially if the material(s) of the acoustic isolation block 150 is susceptible to an adverse reaction to moisture. The peripheral seal 170 thus allows for the use of materials for the isolation block 150 that have superior acoustic dampening characteristics, but might otherwise experience deterioration of acoustic and/or structural properties if exposed to the weather, especially moisture.

Flexible peripheral seal 170 can be formed from a flexible sealant, which can have adhesive properties to form a seal against the opposing top plate 140 and bottom plate 160, soft working characteristics to facilitate application of the sealant in the shop or field, a suitable curing system for high temperature resistance when set, and resilience to resist cracking or failure that might otherwise result from vibration or other movement of the top and bottom plates with respect to each other, or the like. A non-limiting example of a flexible sealant for use with hot pipe 110 is an epoxy polysulfide caulk such as that commercially available under the trade designation UNICOAT 5800 (rated for temperature exposure up to 190° C. (375° F.)). Additionally, a flexible sealant can be disposed between a fastener (e.g., nut 185 and stud 180) and top plate 140 to further prevent exposure of the acoustic isolation block 150. The periphery of the acoustic isolation block 150 can be recessed with respect to the top plate 140 and bottom plate 160 by the thickness of the seal 170 so that an outer surface of the seal 170 is coterminous with the edges of the top and bottom plates. Alternatively, the periphery of top plate 140 and the acoustic isolation block 150 can be coterminous, or offset inwardly or outwardly.

Thermal insulation 190 can be included if desired. Thermal insulation 190 can include, but is not limited to, sprayed or preformed urethane foam insulation or mineral wool. As shown in the embodiment exampled in FIG. 1, FIG. 2, and FIG. 3, thermal insulation 190 can extend to the upper surface of the bottom plate 160, but if desired, thermal insulation 190 can substantially cover any portion of any otherwise thermally exposed surfaces of the pipe 110, clamp 120, support bar 130, top plate 140, acoustic isolation block 150, flexible peripheral seal 170, bottom plate 160, or any combination thereof. A protective covering 195 can be included over the thermal insulation 190. Protective covering 195 can be a metal sheet, for example, stainless steel or aluminum, or a coating of mastic. Thermal insulation 190 and/or protective covering 195 can be bolted, glued, and/or band strapped to the pipe 110 and/or pipe shoe 100 if desired.

In the embodiment exampled in FIG. 1, FIG. 2, and FIG. 3, the protective covering 195 extends to the bottom plate 160 and includes an optional weather seal 175 sealing the protective covering 195 to the upper surface of the bottom plate 160. Weather seal 175 can be an epoxy polysulfide caulk, if desired. Thermal insulation 190 and/or protective covering 195 can extend axially along the pipe 110, for example, to a second shoe of a pipe support system.

Using the embodiment exampled in FIG. 1, FIG. 2, and FIG. 3 for illustrative purposes, an existing pipe shoe, which can include a pipe support member attaching the pipe 110 to a base plate 140 (i.e., top plate), can be modified to dampen acoustic propagation from a hot pipe 110. A sub-base plate 160 (i.e., bottom plate) is provided and acoustic isolation block 150 is disposed for compression between the plates (140, 160) and can be retained together by at least one fastener (e.g., stud 180 and nut 185). The flexible peripheral seal 170, thermal insulation 190, protective covering 195, and/or weather seal 175 can be installed if so desired.

Figure 4:
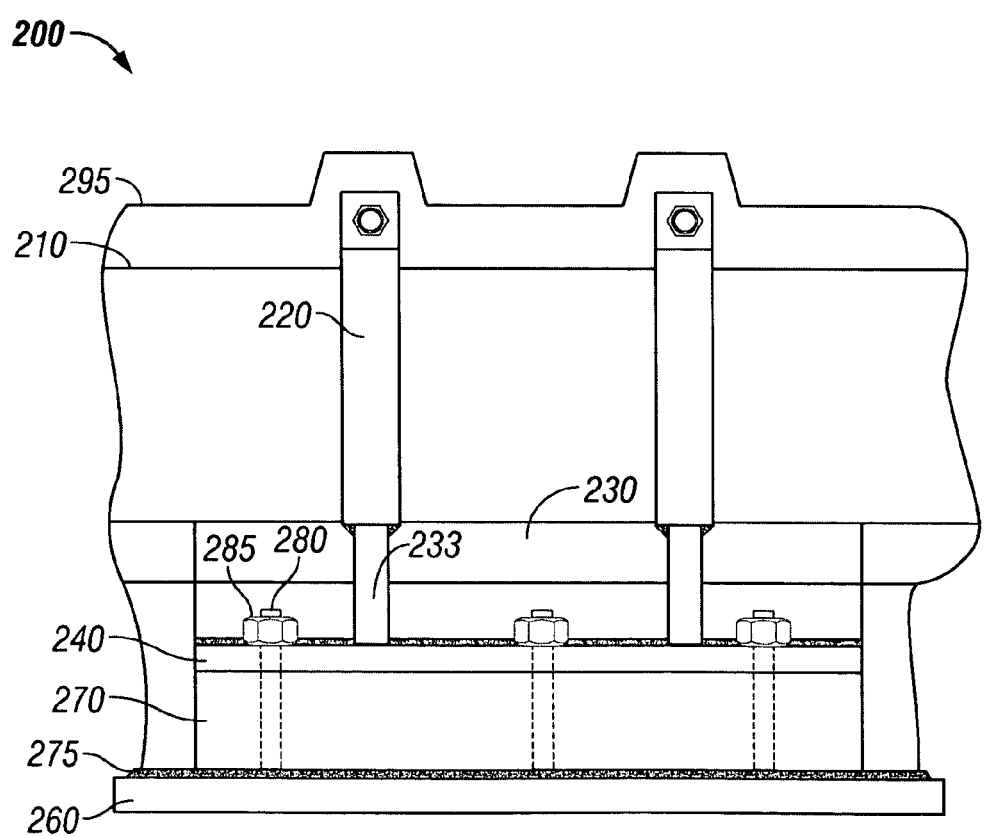
FIG. 4 depicts a side-perspective schematic illustration of a pipe shoe for dampening acoustic propagation from a hot insulated pipe, according to one embodiment.
Figure 5:
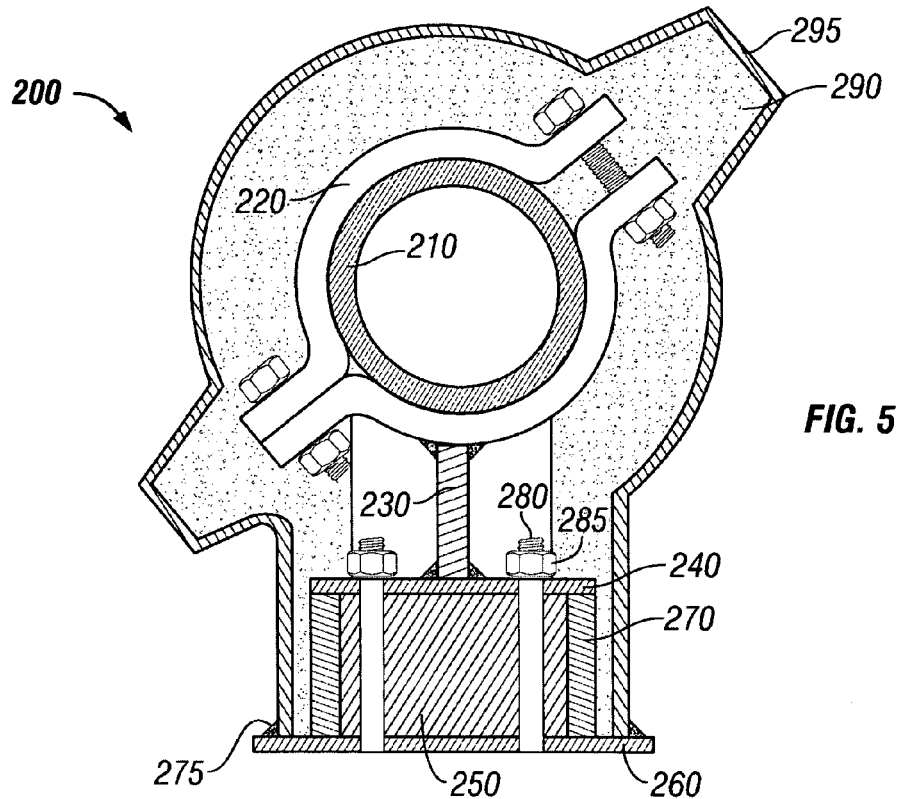
FIG. 5 depicts a cross-sectional schematic illustration of a pipe shoe exampled in FIG. 4.
Figure 6:
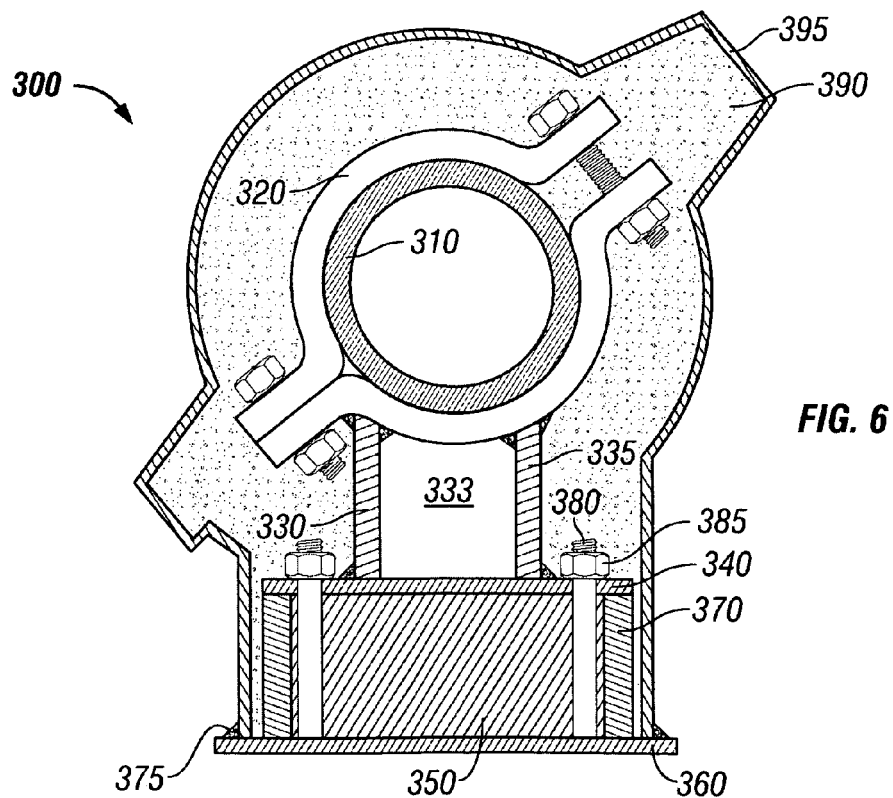
FIG. 6 depicts a cross-sectional schematic illustration of a pipe shoe, according to one embodiment.
Figure 7:
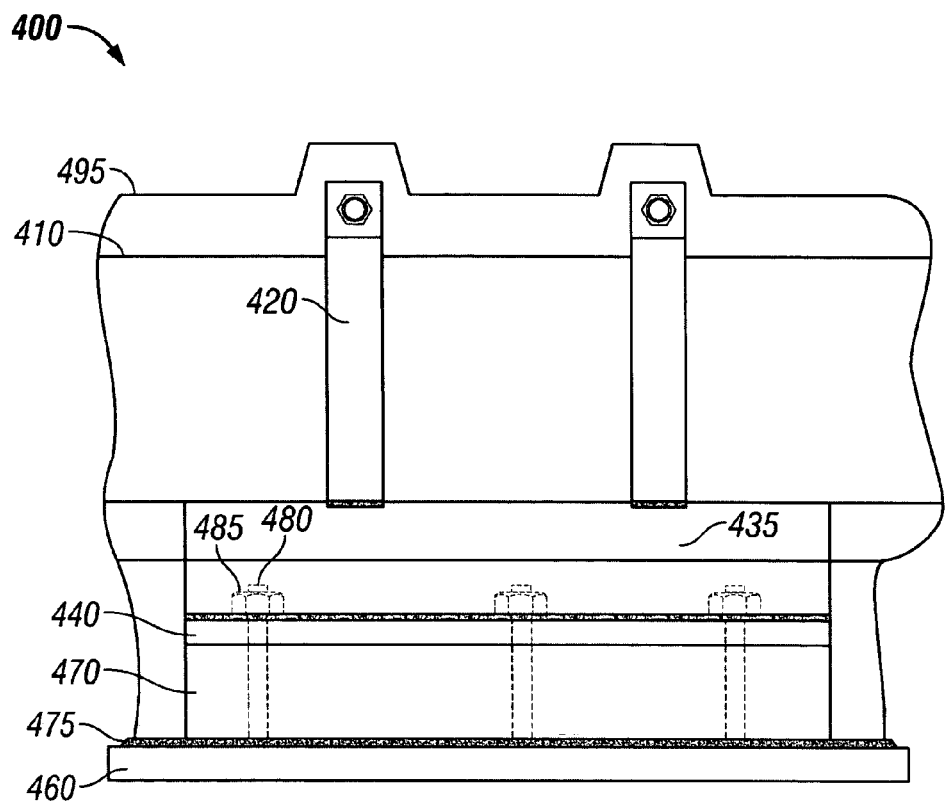
FIG. 7 depicts a side-perspective schematic illustration of a pipe shoe for dampening acoustic propagation from a hot insulated pipe, according to one embodiment.
Figure 8:
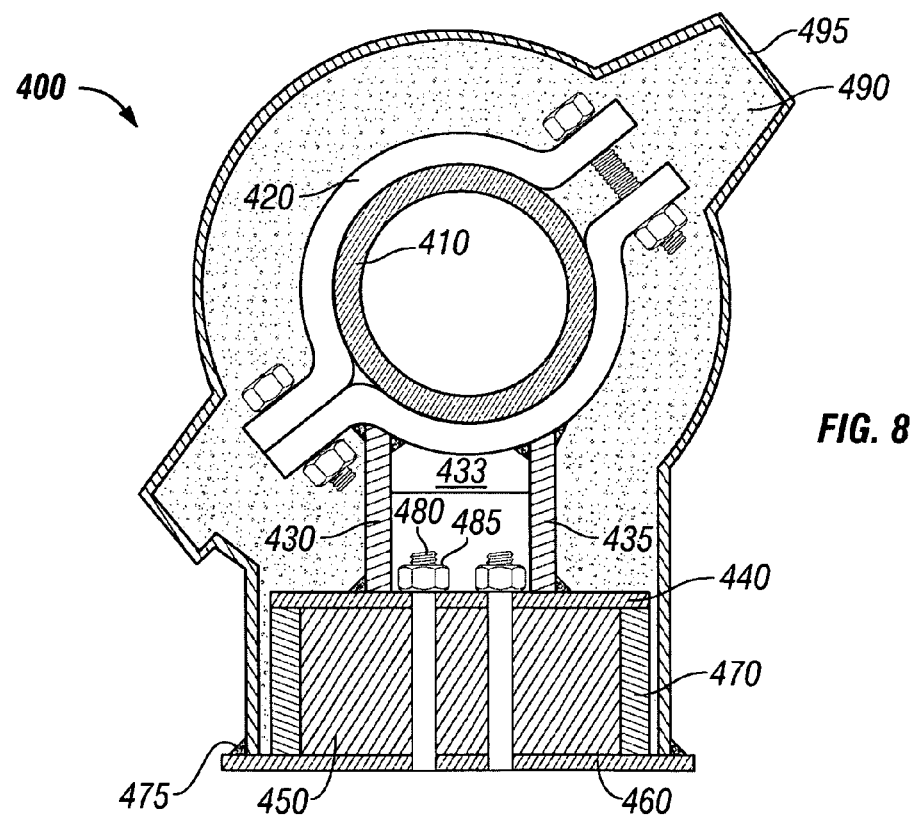
FIG. 8 depicts a cross-sectional schematic illustration of a pipe shoe exampled in FIG. 7.

FIG. 4 depicts a side-perspective schematic illustration of a pipe shoe for dampening acoustic propagation from a hot insulated pipe, according to one embodiment. FIG. 5 depicts a cross-sectional schematic illustration of a pipe shoe exampled in FIG. 4. FIG. 6 depicts a cross-sectional schematic illustration of a pipe shoe, according to one embodiment. FIG. 7 depicts a side-perspective schematic illustration of a pipe shoe for dampening acoustic propagation from a hot insulated pipe, according to one embodiment. FIG. 8 depicts a cross-sectional schematic illustration of a pipe shoe exampled in FIG. 7.

The embodiments exampled in FIG. 4, FIG. 5, FIG. 6, FIG. 7, and FIG. 8 include a pipe (210, 310, 410, respectively) retained by a clamp (220, 320, 420) attached to a top plate (240, 340, 440). Acoustic isolation block (250, 350, 450) is disposed for compression between top plate (240, 340, 440) and bottom plate (260, 360, 460). Top plate (240, 340, 440) is retained to bottom plate (260, 360, 460) by a plurality of studs (280, 380, 480) and nuts (285, 385, 485). Flexible peripheral seal (270, 370, 470) is disposed around the acoustic isolation block (250, 350, 450) between the top (240, 340, 440) and bottom plates (260, 360, 460). Optionally, pipe shoe (200, 300, 400) can include thermal insulation (290, 390, 490) and/or protective covering (295, 395, 495) over any portion or the entirety of pipe shoe (200, 300, 400) and/or pipe (210, 310, 410). Thermal insulation (290, 390, 490) and/or protective covering (295, 395, 495) can include a weather seal (275, 375, 475) at a base thereof.

In the embodiment exampled in FIG. 4 and FIG. 5, pipe support member includes a clamp 220 connected to top plate 240 by a support bar 230. Clamp 220 can be further supported by a gusset 233 disposed transverse to the support bar 230. The term gusset, as used herein, is not limited to triangular shape, and can be any polygonal shape.

In the embodiment exampled in FIG. 6, pipe support member includes a clamp 320 connected to the top plate 340 by dual support bars (330, 335). Optionally, clamp 320 can be further supported by a gusset 333 disposed transverse to the support bars (330, 335).

In the embodiment exampled in FIG. 7 and FIG. 8, pipe support member includes a clamp 420 connected to the top plate 440 by dual support bars (430, 435). Optionally, clamp 420 can be further supported by a gusset 433 disposed transverse to the support bars (430, 435). In this embodiment, the studs 480 and nuts 485 are disposed between support bars (430, 435); however a fastener retaining the top plate 440 to a bottom plate 460 can be disposed at any location thereof. The number of clamps and/or support bars per pipe shoe is not limited to the embodiments shown.

While these embodiments have been described with emphasis on the embodiments, it should be understood that within the scope of the appended claims, the embodiments might be practiced other than as specifically described herein.

What is claimed is:

1. A pipe shoe for dampening acoustic propagation from a hot insulated pipe comprising:
    an acoustic isolation block disposed and compressed between opposing top and bottom plates, wherein the acoustic isolation block comprises fiber-reinforced calcium silicate;
    at least one clamp connected to the top plate supporting a pipe;
    at least one fastener retaining the top plate to the bottom plate and comprising a stud connected to the bottom plate extending through a bore in the acoustic isolation block and the top plate to a nut;
    a flexible peripheral seal between the bottom and top plates around the acoustic isolation block;
    thermal insulation over exposed surfaces of the pipe, the at least one clamp, the top plate, the seal, or a combination thereof; and
    a protective covering over the thermal insulation.

2. The pipe shoe of claim 1, wherein the acoustic isolation block comprises fiber-reinforced calcium silicate.

3. In a pipe support system comprising a hot insulated pipe supported on a pipe shoe comprising a pipe support member attaching the pipe to a base plate, the improvement comprising:
    an acoustic isolation block disposed and compressed between the base plate of the pipe shoe and an opposing sub-base plate;
    a flexible peripheral seal between the base and sub-base plates around the acoustic isolation block;
    at least one fastener retaining the base plate to the sub-base plate;
    thermal insulation over exposed surfaces of the pipe and pipe support member and one or a combination of the sub-base plate, the acoustic isolation block, the peripheral seal, or the base plate; and
    a protective covering over the thermal insulation.

* * * * *